UNITED STATES PATENT OFFICE.

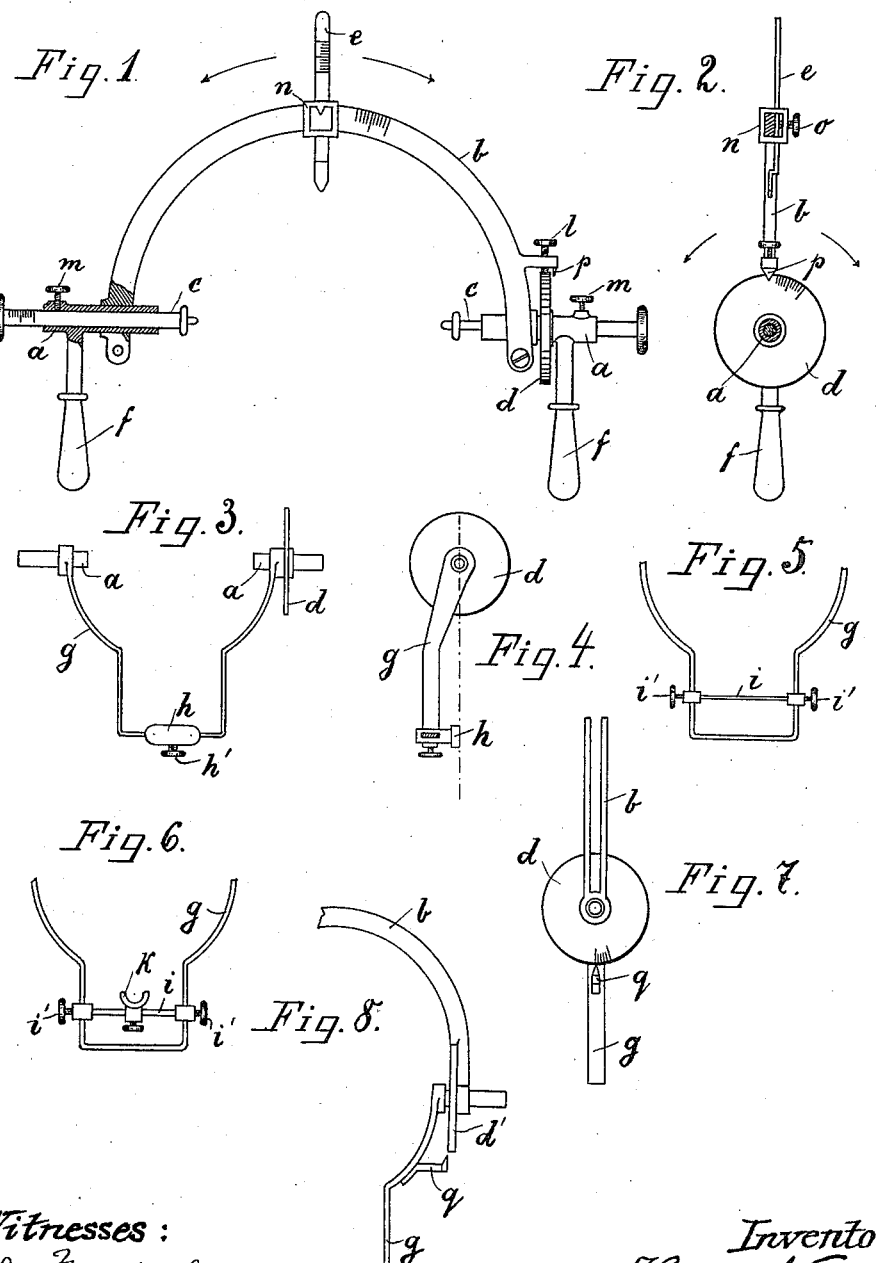

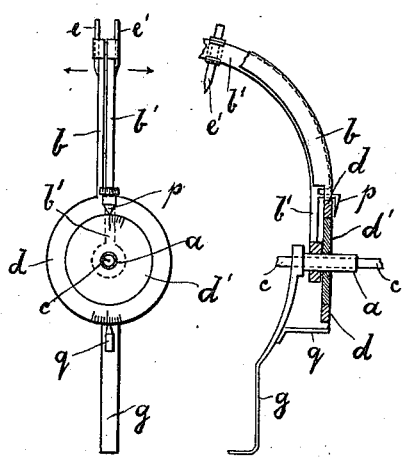
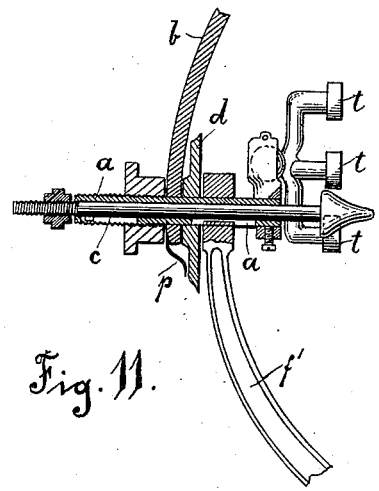
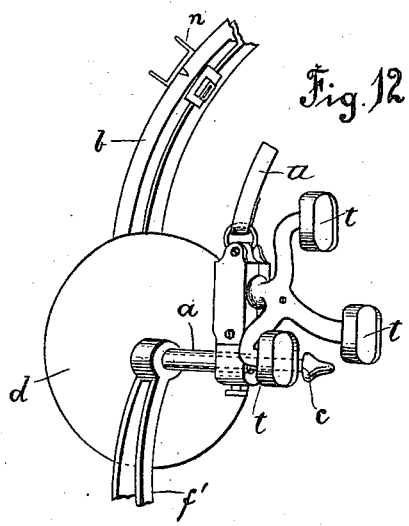

HEINRICH WINTER, OF HAMBURG, GERMANY.

INSTRUMENT FOR MEASURING BODIES.

1,023,542. Specification of Letters Patent. Patented Apr. 16, 1912.

Application filed September 14, 1910. Serial No. 582,017.

*To all whom it may concern:*

Be it known that I, HEINRICH WINTER, doctor of philosophy, chemist, a citizen of the German Empire, and a resident of Hamburg, Germany, have invented certain new and useful Improvements in Instruments for Measuring Bodies, of which the following a specification.

My invention relates to instruments for measuring the shapes of bodies, particularly the shape of the human head.

For reproducing the human head the sculptor had not at disposal heretofore any important auxiliary means for measuring other than the outside caliper and the caliper-square. His only resource was his eye and he had no possibility of determining the individual points of his reproduction in space, of testing their position relatively to a fixed starting point or of proving their agreement with the original by exact measurement.

A primary object of my invention is to provide an instrument, by means of which the human head can be measured and also reproduced in every optional point, so that the artist can take measurements for a bust just as the tailor does for a coat. Of course the formation of the psychic expression remains left, as before, to his artistic comprehension and power of representation. The anthropologist and phrenologist, who had only measuring devices for the cranium heretofore, are hereby also provided with means for determining every point on the head and face of a living person, so that exact comparative studies of individual persons and races can be made.

Some illustrative embodiments of my invention are represented by way of example in the accompanying drawing, wherein:—

Figure 1 is a front elevation, partly in section, of one form of my measuring device, and Fig. 2 is an end elevation of the same; Fig. 3 is a front elevation of a rest which may be fixed to the device and Fig. 4 is a side elevation of the same; Figs. 5 and 6 are front elevations of modified forms of rests; Figs. 7 and 8 are side elevation and front elevation, respectively, showing part of a modified form of my measuring device. Figs. 9 and 10 are respectively a side-elevation and a sectional front-elevation of one form of the measuring instrument with two bows, and Figs. 11 and 12 are respectively a front-elevation partly in section, and a perspective view of the instrument, comprising movable feet for attaching the instrument to the head.

Similar letters of reference indicate corresponding parts throughout the several figures of the drawing.

Referring firstly to Figs. 1 and 2, $a$ designates a horizontal, two-part axle having handles $f$ of optional shape. The two parts of the axle are connected together by a semicircular bow $b$ in whose ends they are journaled. On the right-hand part $a$ is secured a vertical graduated disk $d$; the bow $b$ moves beside or can be held by a set-screw $l$ at this disk, while the pointer $p$ carried by the bow indicates its angular position on the disk $d$. Pins $c$ are movable longitudinally in the hollow parts $a$, $a$ of the axle but can be fixed therein by the set-screws $m$, $m$; the inner ends of the pins $c$ are provided with suitable enlargements or knobs in order that they may be introduced into the air-holes without penetrating any considerable distance into the auditory ducts. The bow $b$ also carries a feeler pin $e$ movable in a guide $n$ and able to be fixed by the set-screw $o$ shown in Fig. 2; consequently, the pin $e$ is movable not only along the bow but also radially. The bow $b$, disk $d$, and the pins $c$, $c$ and $e$ are graduated on the principles described hereinafter.

The above described measuring device is used as follows:—The instrument is placed over the head to be measured and then the ends of the pins $c$ are placed into the ear-holes. The person whose head is to be measured now will take hold of the handles $f$, $f$, whereupon the pins $c$ are adjusted to equal distances from both sides of the head by means of the graduations on them and then the set-screws $m$, $m$ are tightened. By lowering the pin $e$ the distance of every desired point from the bow $b$ or from the center of the semicircle, i. e. the center of the line passing through the center of the ears, is now determined. The angular position in which the measurements on the bow $b$ are made relatively to any desired point are also read on the graduated disk $d$. For determining such zero points I provide auxiliary devices such as are represented by way of example in Figs. 3 to 8.

Figs. 3 and 4 show a rest comprising a bent strap $g$, which is movably connected with the axles $a$, $a$ but rigidly connected with the graduated disk $d$ and carries a stop $h$ for the chin; this stop can be adjusted by a set-screw $h'$ and is caused to rest fairly firmly against the chin. The zero division of the graduation of the disk $d$ is in a plane passing through the point of application of the stop and the central line of the principal axle $a, a$. Consequently all the points from the edge of the chin to the nape of the neck can be obtained in succession by the pin $e$ in planes which pass through the bow $b$ and whose angular positions relatively to the zero division is readable on the disk $d$.

Fig. 5 represents a rest comprising a stop $i$ which is movable on the bent strap $g$ in guides, fixable by means of set-screws $i'$ and consists of a preferably exchangeable, small bar or rod which the person holds between his front teeth. The zero division of the graduated disk $d$ is then set to the top edge of the rod or bar, that is to the bottom edge of the top incisors, and from this point onward toward the nape of the neck this rest admits of more exact measurements than the rests according to Figs. 3 and 4, and Fig. 6.

Fig. 6 likewise shows a rest comprising an adjustable bar $i$ on the strap $g$ carrying in its center a stop $k$ for resting against the root of the nose. This auxiliary device is convenient if only the cranium or the cranium and face are to be measured separately. The zero division of the graduated disk is located in one plane with the center of the stop $k$.

Figs. 7 and 8 show an illustrative embodiment in which the graduated disk $d$ is not attached to the axle $a$ but is rigidly connected with the bow $b$ and moves relatively to the pointer $q$. In this case the angular measurements proceed from the point at which the bow $b$ and the pin $e$ are located in the same plane as the stops $h$, $i$ or $k$. The advantage of this arrangement is that points above the ear on both sides can also be measured by the pin $e$ which is not the case in the arrangement according to Figs. 1 and 2. Further, in order to be able to measure at both halves of the head the bow may be made in two parts $b$, $b'$, as shown in Figs. 9 and 10, and provided with graduations on both parts, each part being able to be swung independently of the other, that is to say, the one to the face and the other to the neck. In this case, one disk $d$ may be provided on each side of the head, each bow bearing a pin $p$, or two disks $d$, $d'$, may be placed on the same side, one of them, $d$, being annular and surrounding the other, $d'$, as shown likewise in Figs. 9 and 10.

Only some simple constructional forms have been described above for the sake of clearness. The device can be made more handy, and durable by modifying it in various ways or by making constructive additions to it. For example, the handles $f$ may be substituted by a firm tubular stirrup $f'$ or bow and the attachment on the head of the person can be facilitated by movable, but fixable feet $t$ surrounding the ears, as shown in Figs. 11 and 12.

The kind of division on the above-mentioned graduated parts of the device depends on the purpose and system of measurement. For example, the graduated disk $d$ may be divided into 360° and the bow $b$ from the highest part toward both sides with 90°-scales, or reversely. If the ends of the bow $b$ are provided with straight extensions 7 cms. long, which is preferable for many purposes, the rectilinear limbs may be graduated in millimeters. The ear pins $c$, $c$ may be graduated in millimeters and also the pin $e$, but in such manner that the numbers on this pin give directly at its guide the radial distance of the point of the pin from the center of the bow or from the line passing through the centers of the ear-holes. When such graduations are used, the following measurements, for example, would be able to be obtained for the highest point on the crown of the head of a measured person:—bow 2° right-hand, pin 15.4 cms., height above point of chin 120°. From three such readings the exact position can be determined of every point within the space which the bow $b$ incloses when moved from the chin to the neck. It is obvious how sculptors can use the device for clay models or for checking the latter. If the values obtained are plotted on paper divided into millimeters diagrams can be obtained in well-known manner reproducing, for example, the profile or an optional section through the line passing through the centers of the ears and enable measurements to be determined which cannot be read directly on the device.

The sizes in which the instrument is to be made depend on the diameter of the human head. Sculptors who wish to represent heads larger or smaller than life size will employ a standard instrument for measuring, but for reproducing will employ a suitably larger or smaller instrument having the same graduation numbers but made correspondingly larger or smaller. For example, for reproducing on twice the original scale the feeler pin of the measuring instrument might have divisions 1 mm. apart while the corresponding pin of the reproducing instrument would have divisions 2 mm. apart but be designated as in the measuring instrument.

I am aware that devices are well-known for reproducing the shape of a lifeless body in one plane; such devices are used, e. g., as profilometers for railway rails. They likewise comprise a semicircular bow to be attached to the body to be examined and have an adjustable slide carrying a pin adjustable in height. The instrument according to my invention differs from such known devices in that the bow is revoluble on the axle of the instrument. This enables measurements to be made in every plane passing through the axle.

I claim:—

In a measuring instrument of the character described for measuring the shapes of human heads and other bodies, the combination, with a two-part axle, of a semicircular bow revoluble thereon, a holding means attached to each part of the axle, a graduated pin movable longitudinally in each part of the axle, a slide movable along the bow, and a graduated pin adjustable radially relatively to the bow in the slide.

Signed at Berlin, Germany, this 3rd day of September 1910.

HEINRICH WINTER.

Witnesses:
 HENRY HASPER,
 WOLDEMAR HAUPT.

Copies of this patent may be obtained for five cents each, by addressing the "Commissioner of Patents, Washington, D. C."